United States Patent [19]

Noguchi et al.

[11] 4,312,305
[45] Jan. 26, 1982

[54] TWO-STROKE CYCLE GASOLINE ENGINE

[75] Inventors: Masaaki Noguchi, Nagoya; Yukiyasu Tanaka; Isao Igarashi, both of Okazaki, all of Japan

[73] Assignee: Toyota Jidosha Kogyo Kabushiki Kaisha, Toyota, Japan

[21] Appl. No.: 57,495

[22] Filed: Jul. 13, 1979

[30] Foreign Application Priority Data

Sep. 18, 1978 [JP] Japan ................. 53-114224

[51] Int. Cl.³ ............................... F02B 25/08
[52] U.S. Cl. ..................... 123/51 BA; 123/51 BD; 123/65 PD; 123/65 W; 123/70 R
[58] Field of Search ............. 123/51 R, 51 B, 51 BA, 123/51 BD, 65 B, 65 P, 65 PD, 73 R, 73 S, 73 AF, 73 AE, 70 R, 65 W

[56] References Cited

U.S. PATENT DOCUMENTS

| | | | |
|---|---|---|---|
| 1,176,096 | 3/1916 | Richter et al. | 123/65 PD |
| 1,978,816 | 10/1934 | Pollister | 123/65 P |
| 2,170,020 | 8/1939 | Gerlach | 123/51 BD |
| 2,347,444 | 4/1944 | Vincent | 123/70 R |
| 2,377,068 | 5/1945 | Bolli | 123/51 BD |
| 2,522,649 | 9/1950 | Tenney | 123/70 R |

FOREIGN PATENT DOCUMENTS 916603  8/1954  Fed. Rep. of Germany ........ 123/65 PD Primary Examiner—Craig R. Feinberg
Attorney, Agent, or Firm—Finnegan, Henderson, Farabow, Garrett & Dunner

[57] ABSTRACT

A two-stroke cycle gasoline engine including at least one two-stroke cycle uniflow scavenging power cylinder-piston assembly which has a scavenging port configuration which consists of first, second, and third scavenging port configurations which are successively uncovered by the power piston as it moves from its top dead center to its bottom dead center, wherein the first scavenging port configuration has a substantially smaller opening area than the second or the third scavenging port configuration, and the first and the second scavenging port configurations give substantially stronger swirl to fuel-air mixture discharged therefrom than the third scavenging port configuration, which gives substantially no swirl to fuel-air mixture discharged therefrom, and the first and second port configurations are closed when the engine is operating at relatively low load above idling and below a predetermined delivery ratio, such as 0.4.

5 Claims, 19 Drawing Figures

TWO-STROKE CYCLE GASOLINE ENGINE

BACKGROUND OF THE INVENTION

The present invention relates to a two-stroke cycle gasoline engine, and, more particularly, to a two-stroke cycle gasoline engine adapted for use with automobiles.

A two-stroke cycle engine has theoretically the advantage that an engine of a certain size can generate a greater power than a four-stroke cycle engine of a bigger size because the two-stroke cycle engine has twice as many work cycles per revolution as the four-stroke cycle engine. In fact, however, a conventional two-stroke cycle gasoline engine employing a carburetor has drawbacks, such as: that it has high fuel consumption as compared with a four stroke-cycle engine due to the loss of fuel-air mixture caused by the direct escape, i.e. blow-out, of scavenging mixture to the exhaust manifold during scavenging; that it cannot generate such a high power as expected from the fact that it has twice as many work strokes as the corresponding four-stroke cycle engine, due to the fact that the scavenging is still insufficient; and that it is subject to unbalanced combustion of fuel in the cylinders, due to the large amount of exhaust gases remaining in the power cylinder because of incomplete scavenging. This unbalanced combustion of fuel due to incomplete scavenging is particularly liable to occur when an engine which is designed to provide a high power output is operated in the idling condition or at a relatively low partial load, as is often the case with automobile engines. If such unbalanced combustion occurs, the engine generates a high level of vibration and noise, and its fuel consumption further deteriorates, together with increase of HC in the exhaust gases.

Methods of scavenging in two-stroke cycle engines are conventionally known as cross scavenging, loop scavenging, and uniflow scavenging. In this connection, if the amount of scavenging mixture is increased so as to improve scavenging efficiency, uniflow scavenging is considered to be most desirable, in order to obtain the highest scavenging efficiency without causing direct escape of the scavenging mixture to the exhaust manifold. In view of this, and in view of the aforementioned drawbacks, the actual application of two-stroke cycle gasoline engines has been conventionally limited to the field of small-size engines in which simplicity of structure and low manufacturing cost are essential conditions. Therefore, conventional two-stroke cycle gasoline engines presently used generally employ crankcase compression for scavenging. However, scavenging by crankcase compression cannot deliver a sufficient amount of scavenging mixture, thereby causing incomplete scavenging which leads to a relatively low volumetric efficiency.

In view of the fact that such a low volumetric efficiency is the principal cause of the poor output power of conventional two-stroke cycle gasoline engines, in a co-pending U.S. patent application Ser. No. 917,244 we have proposed a two-stroke cycle gasoline engine particularly suitable for use as an automobile engine, which comprises at least one two-stroke cycle power cylinder-piston assembly incorporating uniflow scavenging and two horizontally opposed pistons, and at least one scavenging pump cylinder-piston assembly of the reciprocating type, with or without incorporating crankcase compression, wherein the total stroke volume of the scavenging pump means is 1.35 to 1.85 times as large as that of the power cylinder-piston assembly, so that the volumetric efficiency is substantially increased so as to generate high power output when compared with conventional two-stroke cycle gasoline engines.

Furthermore, in view of the fact that, even when a separate pump cylinder-piston assembly is employed as proposed in the abovementioned former application, if the conventional crankcase compression is also incorporated, the operational phase relation between the power cylinder-piston assembly and the scavenging pump means is substantially restricted, we have proposed in our U.S. Pat. No. 4,185,596 not to utilize at all crankcase compression, and to provide a two-stroke cycle gasoline engine piston assembly incorporating uniflow scavenging and two horizontally opposed pistons, and at least one scavenging pump cylinder-piston assembly of the reciprocating type and driven by said power cylinder-piston assembly in synchronization therewith with a phase difference therebetween. The total stroke volume of the pump cylinder-piston assembly is between 1.15 and 1.65 times as large as that of the power cylinder-piston assembly, and the phase difference between the power and the pump cylinder-piston assemblies is so determined that the top dead center of a pump cylinder-piston assembly is, as viewed in the crank angle diagram, in a range between 15° in advance of and 15° behind the midpoint between the bottom dead center and the scavenging port closing phase point of the power cylinder-piston assembly to which it supplies scavenging mixture. This structure substantially improves scavenging efficiency when compared with conventional two-stroke cycle gasoline engines, so that the engine can generate high output power and is suitable for use as an automobile engine.

In either of the abovementioned formerly proposed two-stroke cycle gasoline engines, in order to improve scavenging efficiency, the amount of scavenging mixture is increased by employing an additional or separate pump when compared with the conventional scavenging dependent only upon crankcase compression. In this connection, it is noted that a two-stroke cycle power cylinder-piston assembly incorporating uniflow scavenging and two horizontally opposed pistons generally provides a relatively long distance between its scavenging ports and its exhaust ports when compared with two-stroke cycle engines incorporating other types of scavenging, and that, particularly when such an engine further incorporates an additional or separate scavenging pump means so as to increase the amount of scavenging mixture when compared with the conventional two-stroke cycle engines dependent upon only crankcase compression, as in the aforementioned formerly proposed two-stroke cycle engines, the engine can be constructed as a long-stroke engine having a further increased distance between its scavenging ports and its exhaust ports.

A feature in which uniflow scavenging is different from other types of scavenging is that, if necessary, it is able to perform scavenging without causing any substantial turbulence in the power cylinder. In other words, if it is so designed that scavenging mixture is introduced into a power cylinder through its scavenging ports with as small turbulence or swirl as possible being given to the scavenging mixture, the scavenging mixture then travels in the power cylinder in a stratified manner so that the scavenging mixture and the exhaust gases are transferred from the scavenging ports to the exhaust ports while maintaining stratification between themselves. If such stratified scavenging is performed, and if in this case the scavenging mixture is a mixture of gasoline and air, this mixture is decomposed by heating applied by the exhaust gases in the bordering area between the mixture and the exhaust gases so as to generate chemically activated radicals such as C2, CH, CHO, OOH, H, etc..

In order that such a decomposition of fuel-air mixture is effectively performed, not only a mass of exhaust gases having a high temperature and a high heat capacity is required, but also it is necessary that fuel-air mixture contacts such a mass of exhaust gases at their bordering area without substantially disturbing the mass of exhaust gases, because, if the fuel-air mixture and the exhaust gases substantially mix with each other so that the mass of exhaust gases is disturbed, the exhaust gases are cooled somewhat and fall below the high temperature which is required for effecting the said decomposition of fuel-air mixture. In this connection, in uniflow scavenging it is possible to perform scavenging without causing great mixing between scavenging mixture and exhaust gases, so that they are maintained in a stratified condition, and particularly in an engine which incorporates uniflow scavenging and two horizontally opposed pistons the distance between the scavenging ports and the exhaust ports is made particularly long, whereby the time during which scavenging mixture and exhaust gases contact each other in a stratified condition so that the mixture is decomposed so as to generate activated radicals is longer, thereby increasing the amount of radicals generated.

Therefore, in connection with the concept of employing a two-stroke cycle power cylinder-piston assembly incorporating uniflow scavenging and two horizontally opposed pistons as a power cylinder of a two-stroke cycle gasoline engine, it is contemplated to give as little turbulence as possible to the scavenging mixture introduced into the power cylinder so as to perform scavenging of the power cylinder while maintaining as good a stratified condition as possible between the scavenging mixture and exhaust gases, so that the mixture is decomposed by the high temperature and heat of the exhaust gases so as to generate a large amount of activated radicals and so as to improve combustion of fuel in the power cylinder.

However, in connection with the fact that the present invention intends to provide a two-stroke cycle gasoline engine particularly suitable for use as an automobile engine, it is noted that the abovementioned generation of radicals due to stratified scavenging is effective for improving combustion of fuel when the engine is idling or operating at partial load, thereby effectively solving problems such as high vibration and noise, poor fuel consumption, increase of HC in exhaust gases, etc., due to unbalanced combustion caused by misfiring in idling or low load operation, while on the other hand when the engine is operating at high load the amount of scavenging mixture as well as the rotational speed of the engine increases so that the scavenging speed must be correspondingly increased to such an extent that the decomposition of mixture by exhaust gases is no longer effectively performed. In this operating condition, in order to increase the combustion speed of mixture, it is more effective to give turbulence positively to the mixture so that fuel is well mixed with combustion air. As a result of experiments, we have found that in low load operation at delivery ratio under about 0.4 decomposition of mixture by stratified scavenging is effective for improving combustion of fuel so as to improve fuel consumption by 10%–20% and to reduce concentration of HC in exhaust gases to about $\frac{1}{3}$ when compared with conventional two-stroke cycle gasoline engines, while, on the other hand, in medium to high load operation at delivery ratio at or above approximately 0.4, it is more effective for improving combustion of mixture to give a proper swirl to the flow of mixture introduced into the power cylinder through the scavenging ports so as to generate turbulence in the power cylinder so that fuel-air mixture is strongly agitated. The term "delivery ratio" refers to the ratio of the weight of the total amount of scavenging mixture used in one scavenging of the power cylinder to the weight of scavenging mixture at standard atmospheric conditions which fills the stroke volume space of the power cylinder.

In this connection, in a two-stroke cycle power cylinder-piston assembly incorporating uniflow scavenging and two horizontally opposed pistons wherein a long distance is available between the scavenging and the exhaust ports, if a good stratified condition is maintained during scavenging in low load operation at delivery ratio below approximately 0.4, decomposition of fuel-air mixture can proceed so far as to cause automatic ignition by compression. On the other hand, when a proper swirl is given to the flow of scavenging mixture, particularly in a two-stroke cycle power cylinder-piston assembly incorporating uniflow scavenging and two horizontally opposed pistons, in medium to high load operation at delivery ratio at or above approximately 0.4, the swirl of scavenging mixture is well maintained during the compression stroke, and contributes to accomplishing quick and desirable combustion of fuel after ignition.

Ignition rate of fuel-air mixture in idling operation of two-stroke cycle gasoline engines is substantially lower than that of four-stroke cycle gasoline engines, and, because of this, two-stroke cycle gasoline engines have the drawbacks that they generate high noise and vibration and discharge exhaust gases which have high HC content and an offensive odor. When an engine operates in an irregular combustion mode with occasional misfiring and irregular combustion of fuel-air mixture in a cylinder, as a matter of course the fuel consumption deteriorates. The irregular combustion which occurs in two-stroke cycle gasoline engines is due to insufficient scavenging of the power cylinder, and this is more apt to occur in idling operation in which only a very small amount of scavenging mixture is available. In idling operation, the aforementioned decomposition of fuel-air mixture hardly occurs because the heat capacity of the remaining exhaust gases is very small. Therefore, in order to avoid occurrence of irregular combustion of the engine, it is desirable that the scavenging mixture should be blown into the power cylinder at high speed so that turbulence of the mixture is generated in the power cylinder. This turbulence will blow off the combustion gases remaining around the ignition plug, thereby improving igniting performance of the ignition plug, and will prevent irregular combustion due to increase of the combustion speed of fuel-air mixture.

SUMMARY OF THE INVENTION

It is therefore an object of the present invention to provide an improved two-stroke cycle gasoline engine in which the improvement is made by changing the manner of scavenging the power cylinder in accordance with the load of the engine in such a manner that: in medium to high load operation having delivery ratio at or above 0.4, the scavenging fuel-air mixture introduced into the power cylinder is given a desirable swirl which expedites combustion of the fuel-air mixture in the power cylinder; in low to medium load operation having delivery ratio below 0.4 the scavenging fuel-air mixture introduced into the power cylinder is given substantially no swirl, so that stratified scavenging of the power cylinder is performed during which the fuel-air mixture is decomposed by the heat of the hot exhaust gases existing in the power cylinder and by the heat produced by adiabatic compression of the mixture, thereby also improving combustion of the mixture; and in very low load operation including idling operation the scavenging fuel-air mixture introduced into the power cylinder is again given a swirl, so that turbulences are generated in the power cylinder, which improve the ignition performance and the combustion speed of fuel-air mixture; thus accomplishing the most desirable combustion of fuel-air mixture over the entire load range extending from idling to full load operation.

According to the present invention, the abovementioned object is accomplished by a two-stroke cycle gasoline engine comprising: at least one two-stroke cycle uniflow scavenging power cylinder-piston assembly which has a power cylinder, two horizontally opposed pistons, and a scavenging port configuration consisting of first, second, and third scavenging port configurations provided in the wall of the power cylinder so as to be successively uncovered in the specified order by a power piston as it moves fom its top dead center to its bottom dead center; said first scavenging port configuration having a substantially smaller opening area than said second and third scavenging port configurations; said first and second scavenging port configurations being adapted to give substantially stronger swirl to fuel-air mixture discharged therefrom than the amount of swirl (including zero swirl as its lower extremity) given by said third scavenging port configuration to fuel-air mixture discharged therefrom; and a control valve which interrupts or substantially reduces discharge of fuel-air mixture from said first and second scavenging port configurations only when the engine is operating at relatively low load in a predetermined load range, which excludes very low load including idling and medium to high load having a delivery ratio at or above a predetermined value.

In a two-stroke cycle gasoline engine having the abovementioned scavenging structure, when the engine is operating in idling or very low load condition, as the power piston moves from its top dead center to its bottom dead center, first the first scavenging port configuration is uncovered by the power piston, wherefrom scavenging fuel-air mixture is blown into the power cylinder in a manner to generate a swirl in the power cylinder. In this case, since the first scavenging port configuration has a substantially smaller opening area than the second and third scavenging port configurations (the first scavenging port configuration should desirably be a small opening or openings or a small slit or slits), even in idling or very low load operation, in which a rather small amount of scavenging mixture is supplied, the scavenging mixture discharged through the first scavenging port configuration is given a relatively high speed which can generate a relatively strong swirl in the power cylinder, which is effective to generate such turbulences of fuel-air mixture in the power cylinder that remove exhaust gases remaining around the ignition plug and improve the ignitability and the flame propagation speed of the fuel-air mixture.

When the engine load increases beyond the idling or very low load condition, the supply of scavenging fuel-air mixture to the first and second scavenging port configurations is interrupted, so that the scavenging mixture is supplied only through the third scavenging port configuration, so as not to generate any substantial swirl or turbulences of fuel-air mixture in the power cylinder. In this case, it is contemplated that the fuel-air mixture introduced into the power cylinder forms a layer of fuel-air mixture in the power cylinder while maintaining the boundary between the layer of the mixture and the layer of the exhaust gases existing in the power cylinder as clearly as possible. By this stratified scavenging the fuel existing in the boundary region between the two layers is heated by the heat supplied from the exhaust gas layer and the heat due to adiabatic compression of the fuel-air mixture in the power cylinder, and is decomposed to generate radicals which are effective for improving combustion of the fuel-air mixture. In this manner the improvement of combustion of fuel-air mixture in low to medium load operation is accomplished.

When engine load further increases so that the delivery ratio is at or above 0.4, the supply of scavenging fuel-air mixture through the first and second scavenging port configurations is resumed. In this medium to high load operation the power cylinder is sufficiently scavenged by a large amount of scavenging fuel-air mixture having swirl generated principally by the flow of the mixture discharged through the second scavenging port configuration. The swirl flow further generates turbulences which also contribute to improving the combustion of fuel-air mixture.

As understood from the above-explained scavenging operation, the first and second scavenging port configurations may be supplied with scavenging fuel-air mixture by a common scavenging plenum. Therefore, it is enough for the two-stroke cycle gasoline engine of the present invention to provide a first scavenging plenum which supplies scavenging fuel-air mixture to the first and second scavenging port configurations, and a second scavenging plenum which supplies scavenging fuel-air mixture to the third scavenging port configuration. In this case, the valve which interrupts or substantially reduces discharge of fuel-air mixture from the first and second scavenging port configurations only when the engine is operated at relatively low load in a predetermined load range which excludes very low load including idling and medium to high load having a delivery ratio at or above a predetermined value such as 0.4 may be a valve which is incorporated in a passage for supplying fuel-air mixture to said first scavenging plenum and which selectively closes or throttles the passage. Further, in order to give stronger swirl to the fuel-air mixture discharged into the power cylinder in idling or very low load operation of the engine, it is desirable that the supply of fuel-air mixture to the third scavenging port configuration should be interrupted in idling or very low load operation of the engine. For this purpose a second control valve may be incorporated in a passage for supplying fuel-air mixture to the second scavenging plenum so as to interrupt the passage during idling or low load operation of the engine.

As explained above, the present invention aims to accomplish the desirable combustion of fuel-air mixture over the entire operational region extending from idling to full load operation, in a two-stroke cycle gasoline engine incorporating uniflow scavenging and two horizontally opposed pistons, by the particular combination of the first, second, and third scavenging port configurations, of a valve which selectively interrupts or reduces supply of fuel-air mixture from the first and second scavenging port configurations, and desirably of a second valve which selectively interrupts supply of fuel-air mixture from the third scavenging port configuration. In order to make this concept greatly demonstrate its advantages, it is desirable that the engine should be constructed so as to operate at high scavenging efficiency by not merely depending upon crankcase compression of scavenging mixture but depending upon an additional or independent pump cylinder-piston assembly for the compression of scavenging mixture, as in the two-stroke cycle gasoline engines incorporating uniflow scavenging and two horizontally opposed pistons proposed by our aforementioned former patent applications. However, the concept of the present invention can of course be embodied by employing a two-stroke cycle gasoline engine incorporating uniflow scavenging and two horizontally opposed pistons which depends upon only crankcase compression for the compression of scavenging fuel-air mixture.

BRIEF DESCRIPTION OF THE DRAWINGS

The present invention will become more fully understood from the detailed description given hereinbelow and the accompanying drawings, which are given by way of illustration only, and are not intended to limit the present invention, and wherein.

DESCRIPTION OF THE PREFERRED EMBODIMENTS

Figure 1:
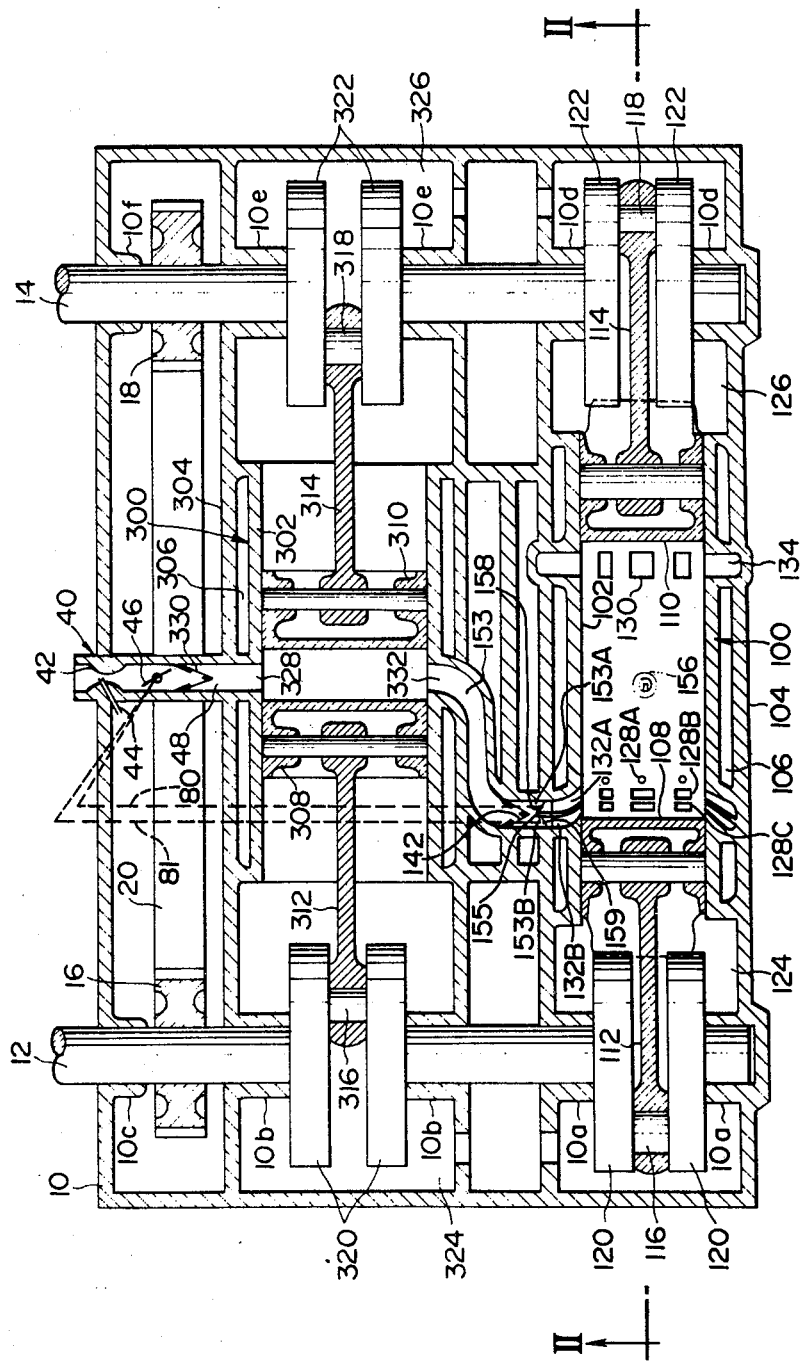
FIG. 1 is a diagrammatical plan sectional view showing a first embodiment of the two-stroke cycle gasoline engine of the present invention.
Figure 2:
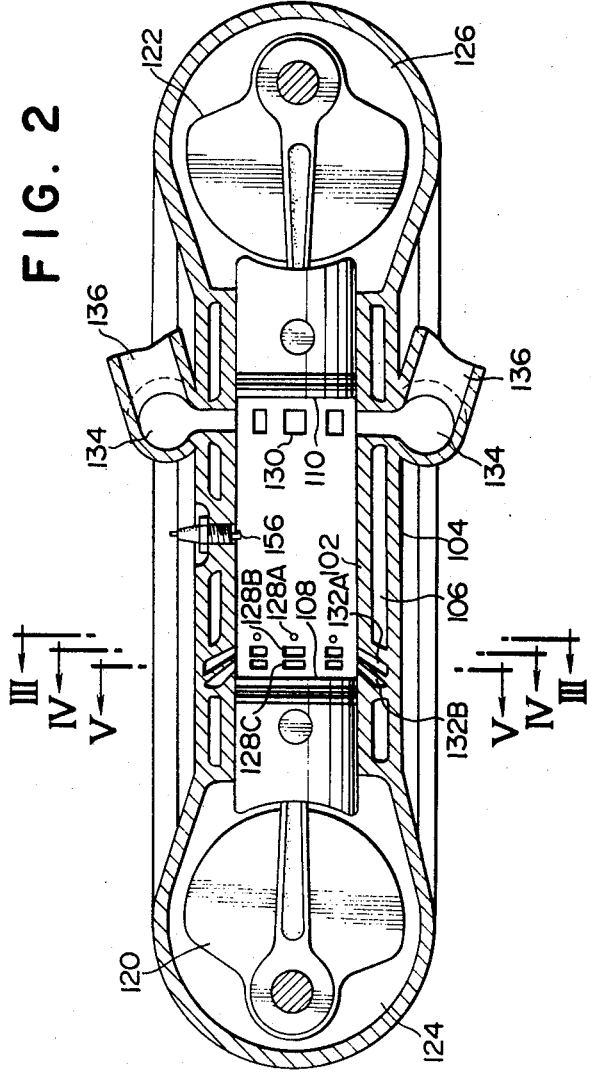
FIG. 2 is a sectional view along line II—II in FIG. 1.

Referring to FIGS. 1–5, showing the first embodiment of the present invention, the two-stroke cycle gasoline engine herein shown comprises a cylinder block 10, the overall shape of which is like a relatively flat block rectangular in a plan view, and which is adapted to be installed substantially with the two largest of its six faces arranged horizontally. In the cylinder block there are provided a pair of crankshafts 12 and 14 which are arranged along opposite edges of the cylinder block and are rotatably supported by bearings 10a–10c and 10d–10f, respectively. In this embodiment, for example, the crankshaft 12 may be connected to auxiliaries of the engine while the crankshaft 14 may serve as the power output shaft of the engine. In the cylinder block 10 there are incorporated a power cylinder-piston assembly 100 and an independent reciprocating type scavenging pump 300, which is in this embodiment a pump cylinder-piston assembly having horizontally opposed pistons. Further, in this embodiment, the power cylinder-piston assembly 100 does not incorporate crankcase compression, and therefore scavenging mixture is compressed only by the independent scavenging pump 300.

First, the power cylinder-piston assembly 100 will be described. The assembly includes a power cylinder 102 supported by the cylinder block 10. The power cylinder is surrounded by a cooling jacket 106 defined by a jacket wall 104. In the cylinder 102 are arranged two power pistons 108 and 110, one being located on the scavenging side or the left side in the figure while the other is located on the exhaust side or the right side in the figure, respectively. The pistons 108 and 110 are individually connected with connecting rods 112 and 114, which in turn are individually connected with crankpins 116 and 118. The crankpins 116 and 118 are individually supported by crank arms 120 and 122. The two crank mechanisms each including the crank arm and the crank pin are individually housed in crankcases 124 and 126. Since in this case no crankcase compression is involved, the crankcases may have any clearance volume.

Figure 3:
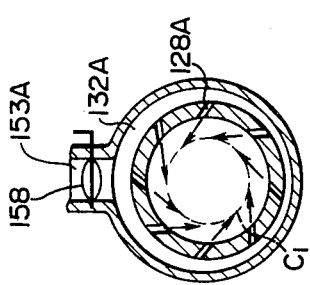
FIGS. 3, 4, and 5 are sectional views along lines III—III, IV—IV, and V—V in FIG. 2.
Figure 4:
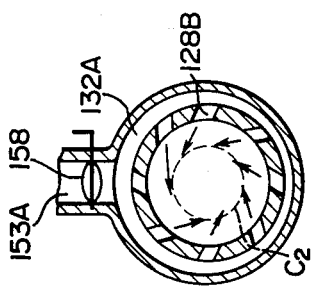

The cylinder 102 has first, second, and third scavenging ports 128A, 128B, and 128C, each being provided in plurality, arranged to be successively uncovered by the power piston 108 as it moves from its top dead center towards its bottom dead center. As shown in FIG. 3, the first scavenging ports 128A open along axes tangential to a phantom cylinder C1 coaxial with the cylinder 102. The total opening area of these first scavenging ports is substantially smaller than that of the second or third scavenging ports 128B or 128C. As shown in FIG. 4, the second scavenging ports 128B also open along axes tangential to a phantom cylinder C2 coaxial with the cylinder 102. By contrast, a shown in FIG. 5, the third scavenging port 128C open towards the central axis of the power cylinder 102. Further, all these scavenging ports are inclined towards the exhaust side of the cylinder so that the flows of scavenging mixture discharged from these scavenging ports have a velocity component towards the exhaust ports 130. Thus, the flows of scavenging mixture discharged from the first and second scavenging ports 128A and 128B are formed into swirl flows which proceed helically in the cylinder 102 towards the exhaust ports, while on the other hand the flows of scavenging mixture discharged from the third scavenging ports 128C collide with each other at the center of the cylinder 102 and then proceed along the central axis of the cylinder towards its exhaust side. The first and second scavenging ports 128A and 128B are connected with a first scavenging plenum 132A, while the third scavenging ports 128C are connected with a second scavenging plenum 132B. These first and second scavenging plenums 132A and 132B are supplied with scavenging mixture from a pump 300, which is explained in detail hereinunder, by way of a passage 153, which is divided at its downstream portion into two passage portions 153A and 153B by a partition 155, said passage portions being individually connected to the first and second scavenging plenums 132A and 132B. In the passage portion 153A is provided a control valve 158 which opens or closes it, while in the passage portion 153B is provided another control valve 159 which opens or closes it. The exhaust ports 130 are connected with an exhaust plenum 134 which is connected with exhaust pipes 136. At a longitudinal central portion of the cylinder 102 is provided a spark plug 156.

Next, the pump 300 will be described. The pump 300 includes a pump cylinder 302 supported by the cylinder block 10. The pump cylinder 302 is surrounded by a cooling jacket 306 defined by a jacket wall 304. This cooling jacket 306 serves to remove the compression heat of mixture generated in the pump 300 so as to increase the volumetric efficiency of the pump, while further, when the engine is operated in cold weather, it serves to warm the pump cylinder so as to expedite atomization of the gasoline. For this purpose, the cooling jacket 306 is connected with the cooling jacket 106 of the power cylinder by a passage means not shown in the figure. In the pump cylinder 303 are provided a pair of pump pistons 308 and 310 as opposed to each other. The pistons 308 and 310 are individually connected with connecting rods 312 and 314 which in turn are individually connected with crank pins 316 and 318. The crank pins 316 and 318 are individually supported by crank arms 320 and 322. The crank mechanisms, composed of the connecting rods, crank pins, and crank arms, are individually housed in crankcases 324 and 326. These crankcases of the pump assembly are connected with the crankcases 124 and 126 so as to balance the pulsations of the crankcase pressure caused by the pistons 308 and 310. Furthermore, the crankcases are connected with the internal space of an air cleaner (not shown in the figure) by a positive crankcase ventilation valve (also not shown in the figure).

Carburetor 40 includes a venturi portion 42, a main fuel nozzle 44 which opens to the throat portion of the venturi portion, and a throttle valve 46, and takes in air from its air inlet port located upward in the figure and produces fuel-air mixture in the usual manner. The mixture outlet port of the carburetor 40 is connected with an inlet port 328 of the pump 300 by way of a passage 48. In the passage 48 or in the port 328 is provided a reed valve 330 which allows fluid to flow only toward the pump chamber. The outlet port 332 of the pump 300 is connected with the scavenging plenums 132A and 132B of the power assembly 100 by way of the passage 153. In this passage and in proximity to the scavenging plenums 132A and 132B is provided a reed valve 142 which prevents blowback of combustion gases from the cylinder 102. If there is no danger of such blowback, this reed valve may be omitted. Furthermore, the reed valve 142 serves to interrupt the flow of mixture from the scavenging plenums to the pump cylinder when high vacuum is generated in the pump 300 due to its suction stroke after the pump pistons have passed their top dead center (TDC). However, when the two-stroke cycle gasoline engine of the present invention which incorporates uniflow scavenging and two horizontally opposed pistons is constructed as in the present embodiment so as to supply scavenging mixture by an independent scavenging pump, it is desirable that the TDC of the pump 300 should be positioned substantially behind the BDC of the power assembly 100, in accordance with the inventive concept proposed in the aforementioned U.S. Pat. No. 4,185,596. In such a case, the period between pump piston TDC and the exhaust port closing phase point is short, and therefore there exists positive pressure around the scavenging ports due to inertia effects even when the pump 300 has entered its suction stroke. Therefore the drawing action of the pump 300 does not substantially affect scavenging of the pump cylinder 102. Therefore, unless the aforementioned blowback of combination gases should occur, there would exist no reverse flow which would need to be interrupted by the reed valve 142.

The control valve 158 provided in the passage 153A connected with the scavenging plenum 132A is operatively connected with the throttle valve 46 by way of a control system 80 diagrammatically shown by a broken line in FIG. 1. The control valve 158 is operated by the control system 80 in accordance with the opening of the throttle valve 46 so that the control valve opens the passage 153A when the throttle valve 46 is fully or almost fully closed or is opened relatively widely so as to provide delivery ratio of 0.4 or above, while on the other hand it closes or substantially throttles the passage 153A when the throttle valve 46 is slightly opened so as to provide delivery ratio of less than 0.4.

Further, in this embodiment another control valve 159 is provided in the passage 153B connected with the scavenging plenum 132B and is operatively connected with the throttle valve 46 by way of a control system 81 also diagrammatically shown by a broken line in FIG. 1. The control valve 159 is operated by the control system 81 in accordance with the opening of the throttle valve 46 so that the control valve closes the passage 153B when the throttle valve is fully or almost fully closed while on the other hand it opens the passage 153B when the throttle valve 46 is slightly or more opened.

Figure 6:
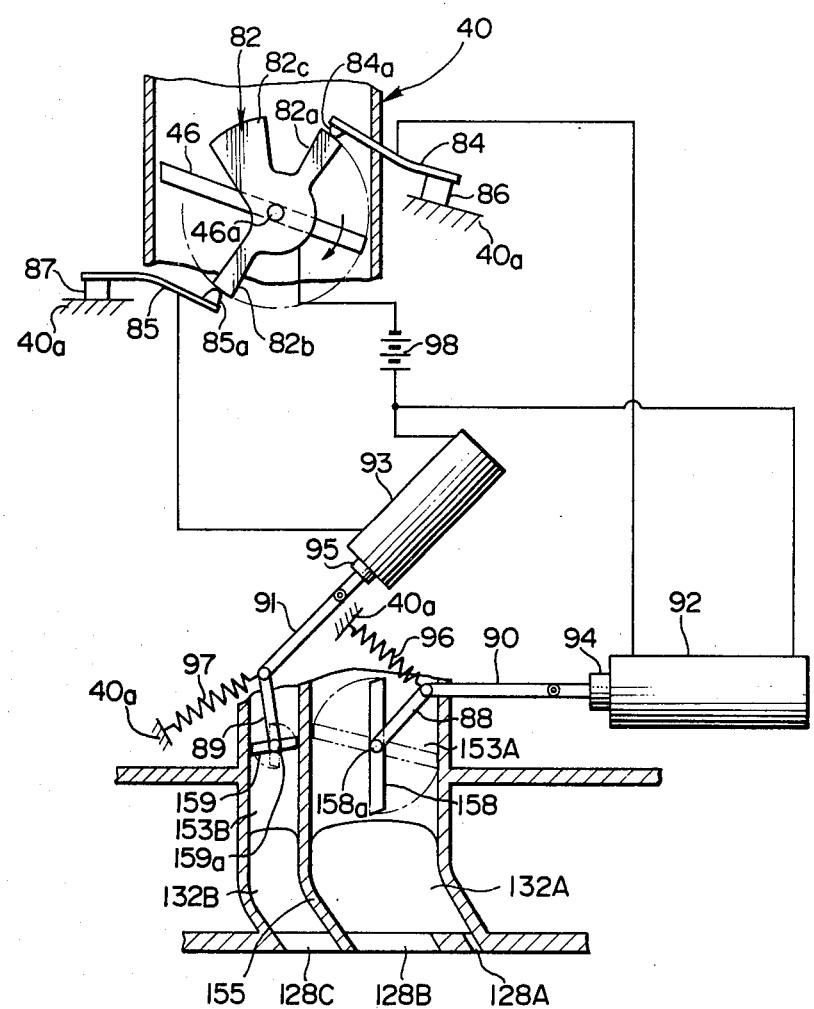
FIG. 6 is a diagrammatical view showing an embodiment of the control system to be incorporated in the two-stroke cycle gasoline engine of the present invention.

The control systems 80 and 81 may be mechanical control systems, electronic control systems, fluid pressure control systems employing manifold vacuum or other fluid pressure, or any of various combinations of these and other control systems. FIG. 6 shows an embodiment of the control systems 80 and 81 constructed as electric control systems.

The throttle shaft 46a of the throttle valve 46 supports a cam 82 mounted thereto, which includes cam portions 82a, 82b, and 82c, and is adapted so that its contacts 82a and 82b contact contact points 84a and 85a of contact elements 84 and 85 formed as spring plates, respectively, when the throttle valve 46 is fully or almost fully closed. The contact elements 84 and 85 are mounted at their one ends to the housing 40a of the carburetor by way of insulating members 86 and 87, respectively. On the other hand, the control valves 158 and 159 have valve shafts 158a and 159a, respectively, which are connected with armatures 94 and 95 of solenoids 92 and 93 by way of link elements 88, 90, and 89, 91, respectively.

When the solenoid 92 is not energized, the control valve 158 is maintained at a position shown by phantom lines in FIG. 6 by the action of an expansion coil spring 92 so as fully or almost fully to close the passage 153A. By contrast, when the solenoid 92 is energized, the control valve 158 is rotated to the position shown by solid lines in FIG. 6, against the action of the expansion coil spring 96, so as fully to open the passage 153A.

Further, when solenoid 93 is not energized, the control valve 159 is maintained at a position shown by phantom lines in FIG. 6 by the action of an expansion coil spring 97 so as fully to open the passage 153B. By contrast, when the solenoid 93 is energized, the control valve 159 is rotated to the position shown by solid lines against the action of the expansion coil spring 97 so as to close the passage 153B.

The solenoids 92 and 93 are selectively energized by an electric source 98 such as the battery of an automobile through switching means composed of the cam 82 and the contact elements 84 and 85. When the throttle valve 46 is fully or almost fully closed as shown in FIG. 6, so that the cam portion 82a is in contact with the contact point 84a while the cam portion 82b is in contact with the contact point 85a, the solenoids 92 and 93 are both energized, and therefore the control valve 158 is fully opened while the control valve 159 is fully closed. When the throttle valve 46 is substantially opened, the cam portions 82a and 82b come out of contact with the contact points 84a and 85a, respectively, and therefore the solenoids 92 and 93 are de-energized. In this condition, the control valve 158 is fully or almost fully closed, by the action of the expansion coil spring 96, while the control valve 159 is fully opened by the action of the expansion coil spring 97. Further, when the throttle valve 46 is widely opened so as to provide delivery ratio at or above 0.4, the cam portion 82c comes in contact with the contact point 84a, and therefore the solenoid 92 is energized. In this condition, the control valves 158 and 159 are both fully opened, so that scavenging mixture is supplied through both the passages 153a and 153b.

As apparent from FIG. 6, the first and second scavenging ports 128A and 128B are supplied with scavenging mixture by the common scavenging plenum 132A, and therefore supply of scavenging mixture to these first and second scavenging ports is controlled by the common control valve 158. On the other hand, the third scavenging ports 128C are supplied with scavenging mixture by the scavenging plenum 132B, and therefore supply of scavenging mixture to the third scavenging ports is controlled by its own particular control valve 159.

Figure 7A:
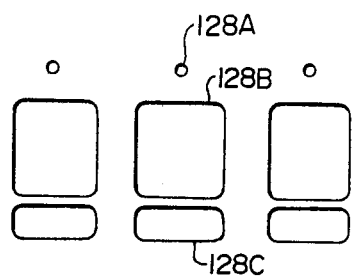
FIGS. 7a–7f are views showing the contours and arrangement of various embodiments of the scavenging port configuration provided in accordance with the present invention, in plane development at enlarged scale.

FIG. 7a shows the contours and arrangement of a first embodiment of the scavenging ports to be incorporated in a two-stroke cycle gasoline engine in accordance with the present invention. This embodiment is the one incorporated in the engine shown in FIGS. 1–5, and includes first scavenging ports 128A, each of which is a small circular opening, and which are opened first as the power piston 108 moves from its TDC towards its BDC, second scavenging ports 128B, each of which is a relatively large rectangular opening, and which are opened somewhat later than the first scavenging ports, as the power piston moves from its TDC to its BDC, and third scavenging ports 128C, each of which is also a rectangular opening, and which are opened somewhat later than the second scavenging ports, as the power piston moves from its TDC to its BDC.

Figure 7B:
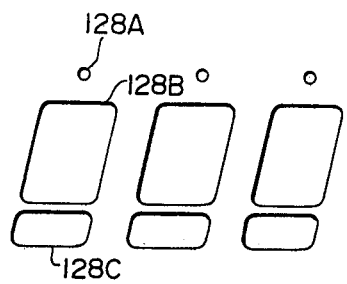

FIG. 7b is a view similar to FIG. 7a, showing a second embodiment of the scavenging ports, which is a small modification of the embodiment shown in FIG. 7a. In this case the second and third scavenging ports 128B and 128C are formed to have side edges which are inclined relative to the generators of the power cylinder 102. By the side edges of the scavenging ports 128B and 128C being inclined relative to these generators, it is avoided that a particular portion of the power piston (in fact, the piston rings provided around the piston) repetitively should engage a side edge of a scavenging port so as to cause local heavy wearing in the piston.

Figure 7C:
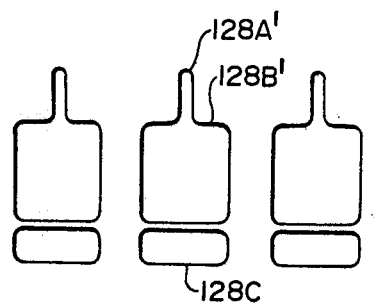

FIG. 7c shows a third embodiment of the scavenging ports, in the same manner as FIG. 7a or 7b. In this embodiment the first scavenging ports 128A and the second scavenging ports 128B in the embodiment shown in FIG. 7a are connected with each other so as to provide a continuous edge. In this case, therefore, first scavenging port portions 128A′, which have a relatively small total opening area are opened first as the power piston 108 moves from its TDC towards its BDC, and second scavenging port portions 128B′ which have a relatively large total opening area are opened later as the power piston 108 moves from its TDC to its BDC.

Figure 7D:
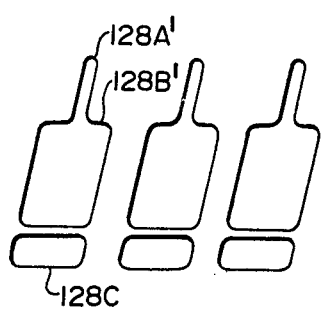

FIG. 7d shows a fourth embodiment of the scavenging ports, which is a small modification of the embodiment shown in FIG. 7c. In this embodiment the side edges of the first and second connected scavenging port portions 128A′ and 128B′ and the third scavenging ports are all inclined to the generators of the power cylinder 102.

Figure 7E:
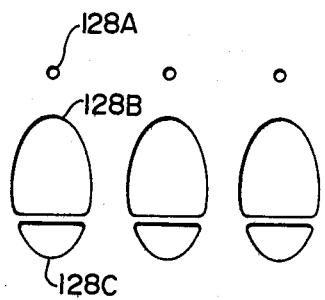

FIG. 7e shows a fifth embodiment of the scavenging ports in the same manner as the preceding figures. In this embodiment the second and third scavenging ports 128B and 128C form in combination elliptical contours. In this case it will be appreciated that, without inclining the longer axis of the ellipses relative to the generators of the power cylinder 102, the effect of avoiding a partial heavy wearing of the power piston is obtained, as in the embodiments of FIGS. 7b and 7d above.

Figure 7F:
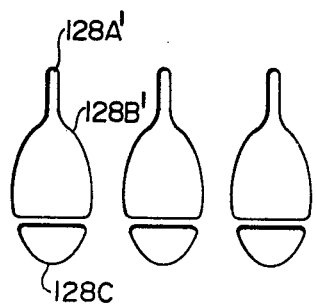

FIG. 7f shows a modification of the embodiment shown in FIG. 7e, wherein the first and second scavenging ports 128A and 128B are replaced by combined first and second scavenging port portions 128A′ and 128B′, as in the embodiments of FIGS. 7c and 7d.

By employing the scavenging ports shown in FIGS. 7a, 7b, and 7e, which have separate first and second scavenging ports 128A and 128B, stable jet flows of scavenging mixture of substantially constant size are maintained for a certain period after the first scavenging ports 128A have been opened, so that a strong swirl flow is generated in the power cylinder which improves ignition and combustion of fuel-air mixture, particularly in idling and low load operation. On the other hand, when the port structures shown in FIGS. 7c, 7d, and 7f having continuous first and second scavenging port portions 128A′ and 128B′ are employed, the jet flows of scavenging mixture discharged from the scavenging ports change so as to increase their size progressively, whereby stronger turbulences are generated in the power cylinder, which are also effective to improve ignition and combustion of fuel-air mixture in the power cylinder, particularly in idling and low load operation of the engine. Depending on circumstances, one or the other configuration may be preferable.

Referring again to FIG. 1, the crankshafts 12 and 14 are drivingly connected with each other by sprocket wheels 16 and 18 individually mounted on the crankshafts and an endless chain 20 engaged around these sprocket wheels so as to co-rotate in the same direction at the same rotational speed. The phase relation between the crankshafts 12 and 14 is so determined that the crankpins 116 and 118 related with the power pistons 108 and 110 are shifted from each other by a phase difference of 180°. Depending upon this phase relation between the crankshafts 12 and 14, the crankpins 316 and 318 related to the pump pistons 308 and 310 are also shifted from each other by the same phase difference of 180°. Further, if the engine is constructed so as also to incorporate the inventive concept proposed in our aforementioned U.S. Pat. No. 4,185,596, the total stroke volume of the pump cylinder-piston assembly 300 is determined to be 1.15–1.65 times as large as that of the power cylinder-piston assembly 100, and the operational phase relation between the power cylinder-piston assembly 100 and the pump cylinder-piston assembly 300 is so determined that the top dead center of the pump cylinder-piston assembly is, as viewed in the crank angle diagram, in a range between 15° in advance of and 15° behind the midpoint between the bottom dead center and the scavenging port closing phase point of the power cylinder-piston assembly 100.

Figure 8:
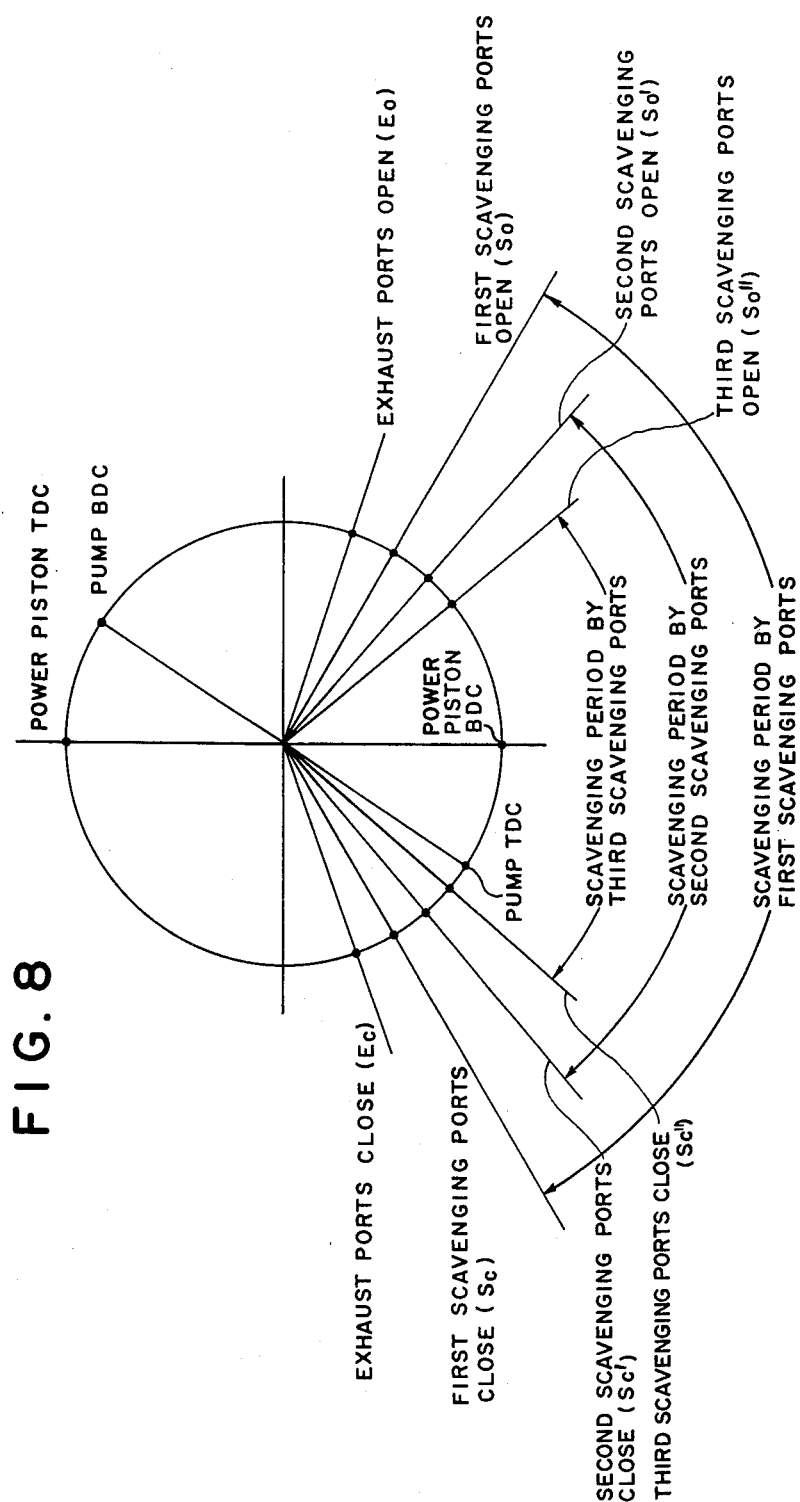
FIG. 8 is a crank angle diagram showing the operational phases of the engine shown as the first embodiment of the present invention.
Figure 9:
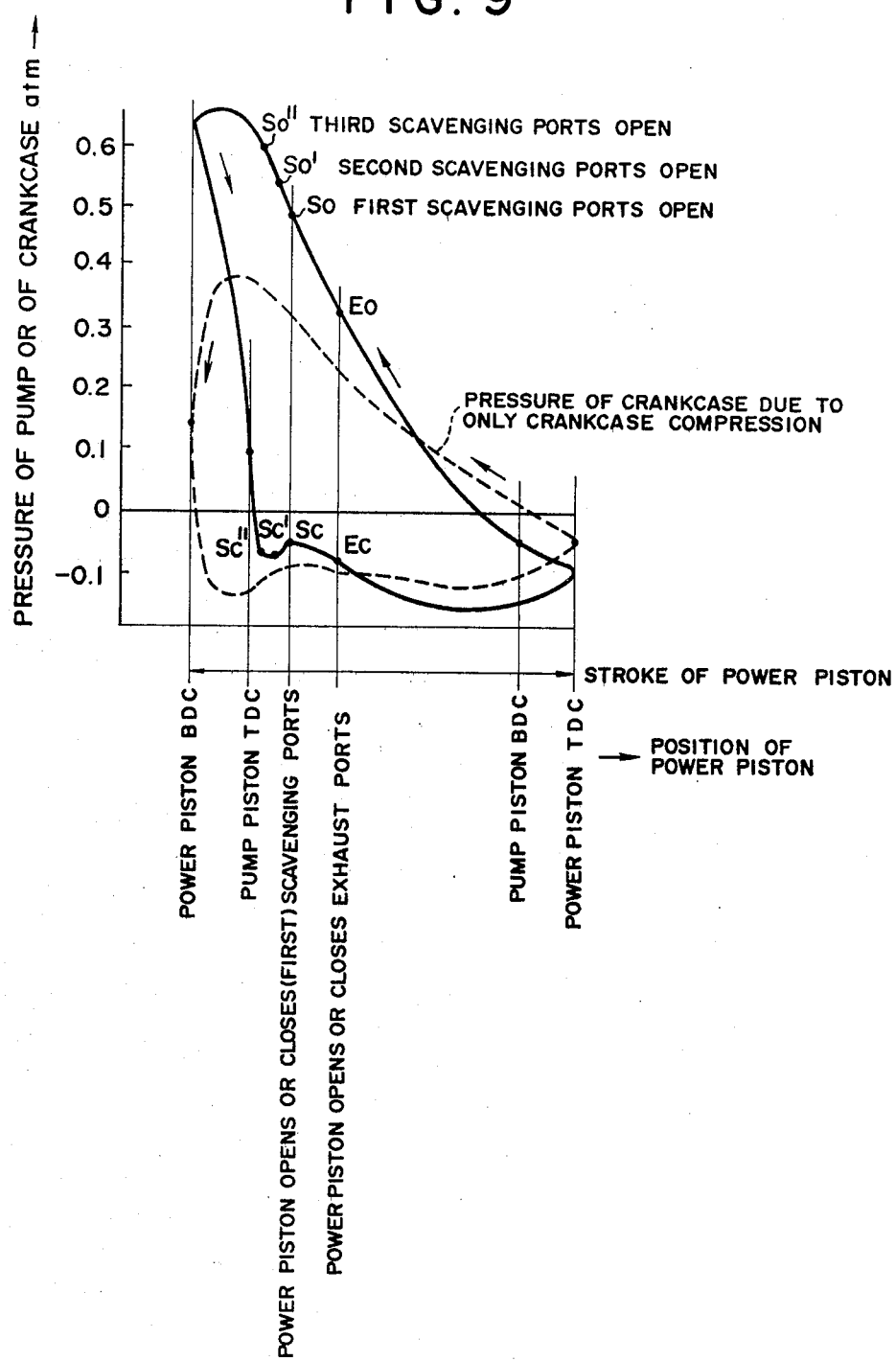
FIGS. 9 and 10 are indicator diagrams showing changes of the pump pressure relative to the position of the power piston in the engine shown in FIGS. 1–5, in full throttle operation and idling operation, respectively.
Figure 10:
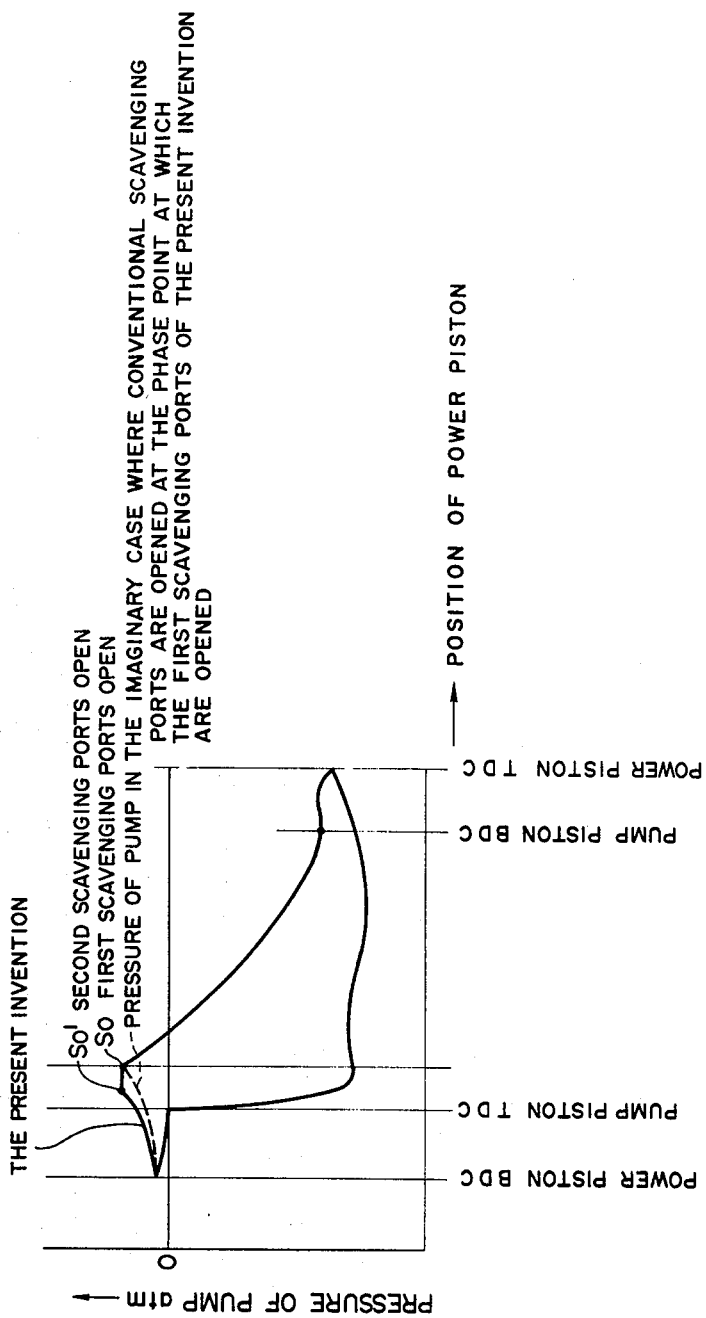

FIG. 8 is a crank angle diagram of the engine shown in FIGS. 1–5, while FIGS. 9 and 10 are indicator diagrams showing changes of the pump pressure of the engine shown in FIGS. 1–5 relative to the position of the power cylinder, in full throttle operation and idling operation, respectively. When the power pistons proceed from their TDC by an angle slightly larger than 90° as seen in the crank angle diagram, the exhaust ports 130 are opened (exhaust port opening phase point Eo) so as to discharge exhaust gases therethrough. When the pressure of exhaust gases has substantially dropped, the first scavenging ports 128A are opened (first scavenging port opening phase point So), and then, slightly delayed therefrom, the second scavenging ports 128B are opened (second scavenging port opening phase point So'), and then, further slightly delayed therefrom, the third scavenging ports are opened (third scavenging port opening phase point So"). Since the crankpins 116 and 118 are synchronized with each other so as to have a phase difference of 180° therebetween, in FIG. 8 the phase point Eo where the exhaust ports are opened and the phase point Ec where the exhaust ports are closed are positioned symmetrically with respect to the center line which connects TDC and BDC of the power piston, and similarly the phase points So, So', and So" where the first, second, and third scavenging ports are opened and the phase points Sc, Sc', and Sc" where the first, second, and third scavenging ports are closed are positioned symmetrically to the aforementioned center line, respectively. Further, in this embodiment the operational phase of the pump pistons relative to that of the power pistons, i.e. the phase difference of the crankpin 316 or 318 relative to the crankpin 116 or 118, respectively, is determined so that, as seen in the crank angle diagram, TDC of the pump is retarded relative to BDC of the power piston by about 30°. This phase setting of substantially retarding pump TDC from power piston BDC depends upon the inventive concept of the aforementioned U.S. Pat. No. 4,185,596. However, when the two-stroke cycle gasoline engine in accordance with the present invention is constructed to employ only crankcase compression without incorporating any supplementary or independent scavenging pump, pump TDC naturally coincides with power piston BDC.

When the pump pistons 308 and 310 move from their TDC to their BDC so as to perform a suction stroke, fuel-air mixture generated in the carburetor 40 is drawn into the power cylinder 302 through the reed valve 330. During this suction stroke the power pistons 108 and 110 perform a compression stroke, wherein the scavenging ports 128A, 128B, and 128C are closed by the power piston 108. Then, the pump pistons 308 and 310, after having passed their BDC, perform a compression stroke, whereby the mixture is compressed in the pump cylinder 302. When the power cylinder 110 has reached the exhaust port opening phase point Eo so that the exhaust ports are opened, the exhaust gases in the power cylinder 102 are exhausted through the exhaust ports, with the pressure of exhaust gases in the power cylinder being rapidly lowered. Then the first scavenging ports 128A are opened by the power piston 108. If at that time the engine is operating at such relatively high load that the delivery ratio is above 0.4, since the control valve 158 is opened, the scavenging mixture compressed by the pump 300 is supplied to the first scavenging plenum 132A through the passage 153A, and therefore when the first scavenging ports 128A are opened the scavenging mixture is immediately ejected into the power cylinder 102 with a relatively strong swirl given thereto. However, since the total amount of scavenging mixture is large in such relatively high load operation that provides delivery ratio above 0.4, the proportional amount of scavenging mixture discharged from the first scavenging ports 128A is very low. When the power pistons further proceed towards their BDC, the second scavenging ports 128B are opened, and a large amount of scavenging mixture is injected into the power cylinder 102 with relatively strong swirl. Then, when the power pistons further proceed towards their BDC, the third scavenging ports 128C are opened, and some amount of scavenging mixture is discharged into the power cylinder through these third scavenging ports with no swirl. The scavenging mixture discharged from the third scavenging ports flows along the central axis of the power cylinder towards the exhaust ports 130 through the central portion of the swirling flow of mixture which is generated by the scavenging mixture discharged from the first and second scavenging ports 128A and 128B and is proceeding towards the exhaust ports 130 while swirling, whereby the scavenging mixture discharged from the third scavenging ports scavenges the axially extending central portion of the power cylinder which is less scavenged by the swirling flow of scavenging mixture generated by the first and second scavenging ports.

When the engine is operating at low to medium load above idling and below 0.4 delivery ratio, since the passage 153A is closed or substantially throttled by the control valve 158, the scavenging mixture is substantially exclusively supplied to the second scavenging plenum 132B through the passage 153B. In this case, even when the first and second scavenging ports 128A and 128B are opened as the power pistons proceed from their TDC towards their BDC, no substantial scavenging is performed. Then, when the power pistons further proceed towards their BDC so as to uncover the third scavenging ports 128C, scavenging is initiated, wherein the flows of scavenging mixture ejected into the power cylinder from the third scavenging ports with no swirl collide with each other at a central portion of the power cylinder, and scavenging mixture gradually accumulates in the power cylinder in a stratified manner without generating any helical flow, and as the amount of scavenging mixture increases, the layer of scavenging mixture urges exhaust gases, particularly those existing at a radially central portion of the power cylinder, towards the exhaust ports along the central axis of the power cylinder, while maintaining a stratified condition between the scavenging mixture and the exhaust gases without causing any great mixing therebetween. By this mutually adjacent existence of the layers of scavenging mixture and exhaust gases with no great mixing therebetween, and by the formation of the layer of scavenging mixture along the central axis of the power cylinder, fuel-air mixture forming the scavenging mixture is heated at a boundary region between the two layers by a hot mass of exhaust gases having high heat capacity, without being cooled by the cylinder wall, and is decomposed, further helped by the heat generated by adiabatic compression of the mixture, so as to generate chemically active radicals such as C2, CH, CHO, OOH, H. When the control valve 158 does not completely close but substantially throttles the passage 153A, a small amount of scavenging mixture discharged from the scavenging ports 128A and 128B causes a moderate convection flow in the power cylinder, which has the effect of improving heat transmission from the layer of exhaust gases to that of fuel-air mixture.

When the engine is operating at a relatively low delivery ratio, such as below 0.4, the amount of exhaust gases which remains in the power cylinder and forms the abovementioned layer of exhaust gases is relatively large and has a relatively large heat capacity. Such a mass of exhaust gases can cause decomposition of the injected fuel-air mixture to an extent that is substantially effective for improving combustion of fuel in the engine. Further, since in low load operation a substantial amount of exhaust gases remains in the power cylinder after the completion of the scavenging process, even in the subsequent compression stroke the decomposition of fuel-air mixture in the boundary region between the layers of scavenging mixture and exhaust gases continues. Therefore, when an engine is operated at a delivery ratio below 0.4 and at a rotational speed below 2000 rpm, the decomposition of fuel-air mixture proceeds so far that at the end of compression stroke the mixture nearly ignites by compression. By contrast, when the engine is operating at relatively high load with delivery ratio being higher than 0.4, when the first and second scavenging ports 128A and 128B are opened, scavenging mixture is ejected into the power cylinder with a relatively great swirl so as to form a helical flow in the power cylinder, wherein no boundary surface between layers of scavenging mixture and exhaust gases effective for decomposition of fuel-air mixture is formed, and the exhaust gases remaining in the power cylinder are rapidly cooled down by a large amount of scavenging mixture.

When the engine is idling or operating at very low load close to idling, if the engine had only the second and third scavenging ports 128B and 128C, since the opening area of the scavenging ports rapidly increases as the power piston traverses them, the scavenging pressure, i.e., the crankcase pressure, would immediately and rapidly decrease as the scavenging ports were opened by the traversing of the power piston, as shown by a broken line in FIG. 10. However, when it is so arranged that the first scavenging ports 128A having a relatively small total opening area are opened prior to the second and third scavenging ports 128B and 128C which have the relatively large total opening area which is required in medium through high load operation, the scavenging pressure or the crankcase pressure is maintained at the pressure level available at the instant when the first scavenging ports 128A are opened, for a certain period, even after these first scavenging ports have been opened, as shown by a solid line in FIG. 10. During this period the strong jet flows of scavenging mixture discharged from the first scavenging ports generate turbulences in the power cylinder which improve the ignitability of fuel-air mixture in idling and very low load operation close to idling of the engine, so as to increase combustion speed of fuel-air mixture, so that the irregular combustion in prior art engines due to poor ignitability and low speed of combustion is effectively avoided.

In medium through high load operation the amount of scavenging mixture is large enough to effect sufficient scavenging and to generate strong turbulences in the power cylinder even when scavenging mixture is discharged from scavenging ports having a relatively large total opening area such as the second and third scavenging ports 128B and 128C, and therefore in this case the first scavenging ports 128A contribute little to improving ignitability and combustion speed of the fuel-air mixture.

In the embodiment shown in FIG. 6, when the engine is idling or operating at very low load close to idling, the control valve 158 is opened while the control valve 159 is closed, and therefore supply of scavenging mixture from the third scavenging ports 128C is interrupted, so that a larger amount of scavenging mixture is ejected through the first and second scavenging ports 128A and 128B, whereby stronger turbulences are generated in the power cylinder. However, since the function of generating strong turbulences in the power cylinder in idling or very low load operation of the engine is principally performed by the first scavenging ports 128A while the second and third scavenging ports 128B and 128C are still closed by the power piston 108, the control valve 159 which closes the passage 153B in idling or very low load operation of the engine is not necessarily required. However, by providing the control valve 159 the effect of generating stronger turbulences over the entire scavenging period in idling or very low load operation of the engine is available.

After the scavenging has been performed in the aforementioned manner, and when the power pistons 108 and 110 proceed from their BDC towards their TDC, the scavenging ports 128C, 128B, and 128A are successively closed in order by the power piston 108, and then the exhaust ports 130 are closed by the power piston 110. Thereafter, the scavenging mixture is compressed in the power cylinder, and at a phase point slightly before power piston TDC the mixture is ignited by the spark plug 156, and then the engine proceeds to the combustion and expansion stroke, and at the end of the expansion stroke the exhaust ports 130 are again opened. By the repetition of these strokes the engine generates rotary power.

Figure 11:
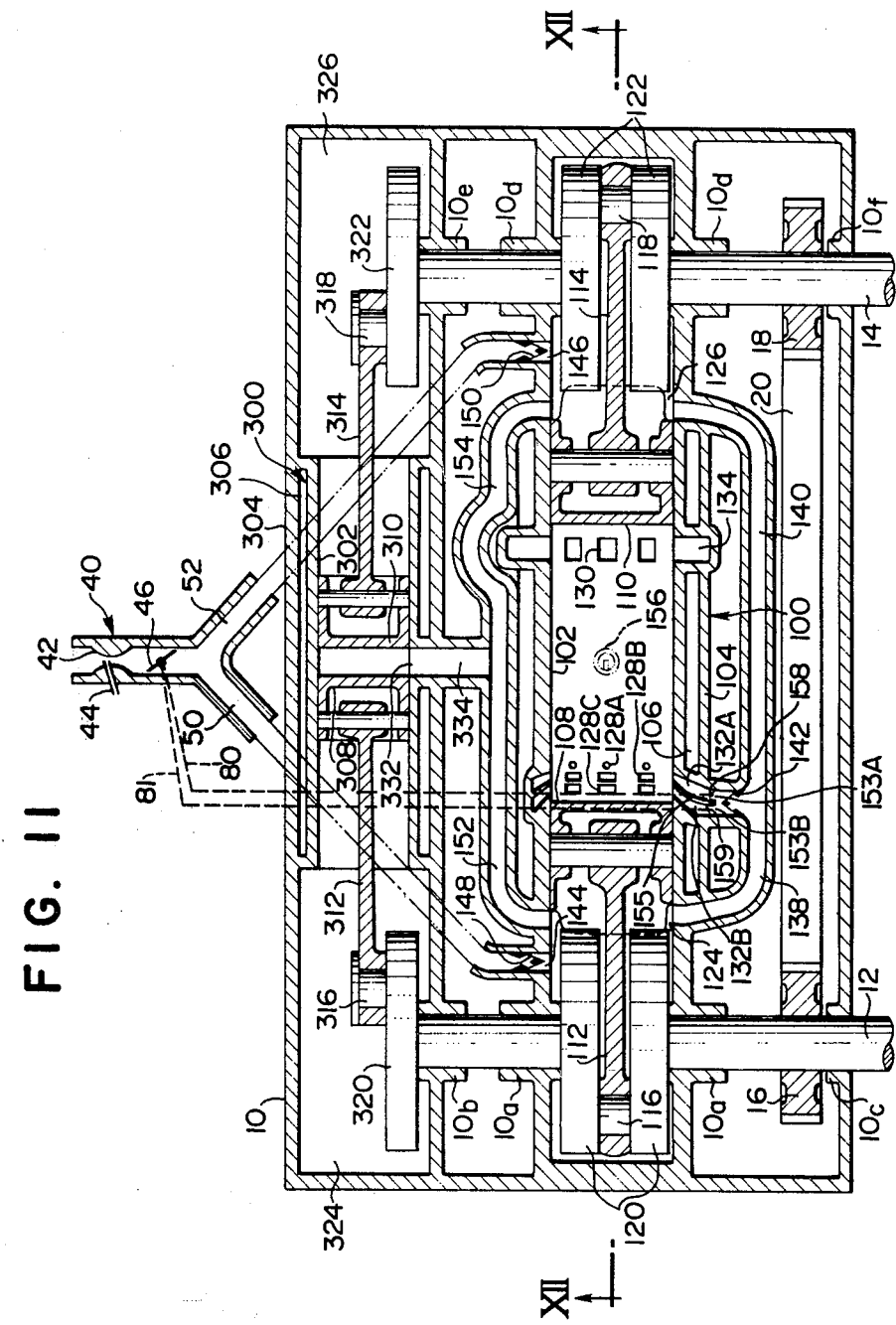
FIG. 11 is a diagrammatical plan sectional view showing a second embodiment of the two-stroke cycle gasoline engine of the present invention.
Figure 12:
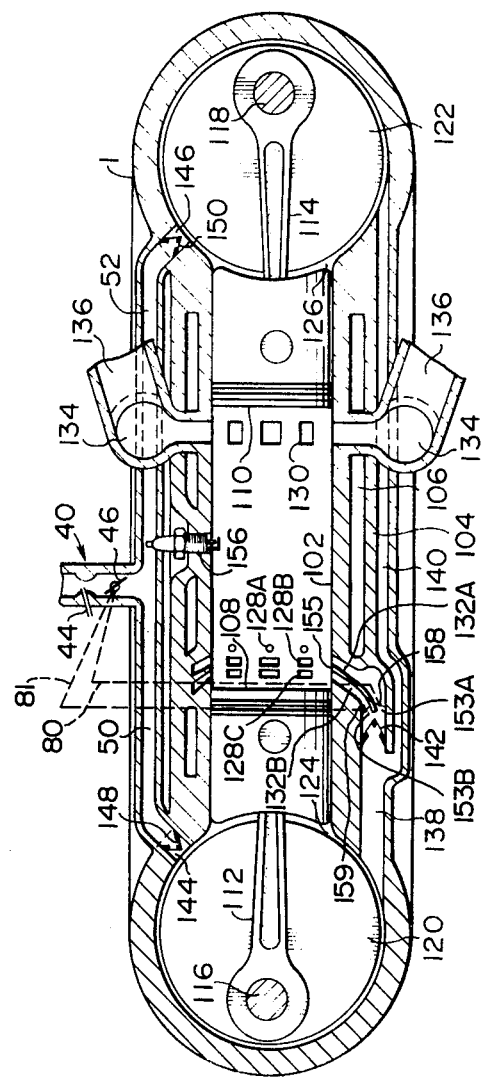
FIG. 12 is a sectional view along line XII–XII in FIG. 11.

FIG. 11 is a diagrammatical plan sectional view showing a second embodiment of the two-stroke cycle gasoline engine of the present invention, and FIG. 12 is a sectional view along line XII—XII in FIG. 11. In these figures the portions corresponding to those shown in FIGS. 1–5 are designated by the same reference numerals as in FIGS. 1-5. This second embodiment employs crankcase compression in addition to a supplementary scavenging pump for compressing scavenging mixture. In this embodiment the crank arms 120 and 122 of the power assembly 100 are disk-shaped, and crank assemblies each being composed of a pair of these crank arms and a crank pin connecting the pair of crank arms are received in the crankcases 124 and 126, respectively, so that a substantial part of the space in each crankcase is occupied by the crank assembly, regardless of the rotational angle of the crank arms, so as to minimize the clearance volume of the crankcase and to increase the effectiveness of the crankcase compression. In this embodiment the outlet of the carburetor 40 is connected with the crankcases 124 and 126 of the power assembly 100 by way of passages 50 and 52, so that the mixture generated by the carburetor 40 is directly supplied to the crankcases 124 and 126. In ports 144 and 146 at which the passages 50 and 52 open to the crankcases 124 and 126, respectively, are provided reed valves 148 and 150, respectively, so as to prevent reverse flowing of scavenging mixture. The crankcases 124 and 126 are connected with an outlet port 332 of the supplementary scavenging pump 300 by way of passages 152 and 154, respectively, and a common passage 334 on the one hand, while on the other hand the crankcases 124 and 126 are connected with the common entrance to the first and second scavenging plenums 132A and 132B by way of passages 138 and 140, respectively. In this case, in a portion in which the passages 138 and 140 are joined with each other so as to be connected with the common entrance to the first and second scavenging plenums 132A and 132B is provided a partition 155 which defines passage portions 153A and 153B separated from each other and individually connected to the scavenging plenums 132A and 132B. In the passage portions 153A and 153B are provided control valves 158 and 159 which selectively close the passage portions 153A and 153B, respectively. The control valves 158 and 159 are controlled by control systems 80 and 81, respectively, so as to be opened or closed in accordance with the opening of the throttle valve 46, in the same manner as in the first embodiment shown in FIGS. 1-5.

Figure 5:
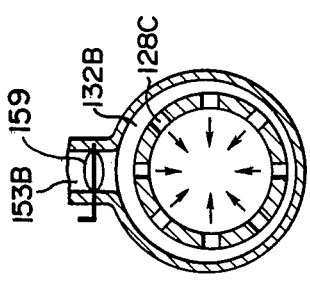

Also in this second embodiment, the first, second, and third scavenging ports 128A, 128B, and 128C are formed as shown in FIGS. 3, 4, and 5 with regard to the first embodiment, i.e. the first and second scavenging ports 128A and 128B open along axes tangential to phantom cylinders coaxial with the cylinder 102 so as to impart a relatively strong swirl to the mixture ejected from the scavenging ports, while on the other hand the third scavenging ports 128C open toward the central axis of the power cylinder so as not to impart any swirl to the mixture ejected from them. Furthermore, all these scavenging ports are inclined towards the exhaust side of the cylinder, so that the flows of scavenging mixture discharged from these scavenging ports have a velocity component towards the exhaust ports 130. Further, the scavenging ports may have the same configurations as those shown in FIGS. 7a-7f.

In this second embodiment which employs crankcases and a supplementary scavenging pump for the compression of scavenging mixture, in the suction stroke the crankcases 124 and 125 take in mixture through the passages 50 and 52 and a carburetor 40, while the pump 300 which operates substantially in the same phase as the crankcases 124 and 126 takes in mixture from the crankcases 124 and 126 through the passages 152, 154, and 334, and therefore, as a whole, further through the passages 50 and 52 and the carburetor 40. When the crankcases 124 and 126 and the pump 300 begin to perform their compression strokes, the mixture in the crankcases 124 and 126 is compressed in these crankcases while remaining therein, while on the other hand the mixture drawn into the pump cylinder 302 is again pushed back to the crankcases 124 and 126 through the passages 334, 152, and 154 as it is compressed between the pump pistons 308 and 310. The mixture thus compressed in either of the two crankcases or in both the pump cylinder and either of the two crankcases is supplied towards the first and second scavenging plenums 132A and 132B through the passage 138 or 140. Also in this embodiment, when the engine is operating at relatively high load with a delivery ratio at or higher than 0.4, the control valves 158 and 159 are both opened, and therefore scavenging mixtures are ejected through all of the first, second, and third scavenging ports 128A, 128B, and 128C. In this case, scavenging of the power cylinder is sufficiently performed by a large amount of scavenging mixture having relatively strong swirl generated by the flows of scavenging mixture ejected from the first and second scavenging ports.

Figure 13:
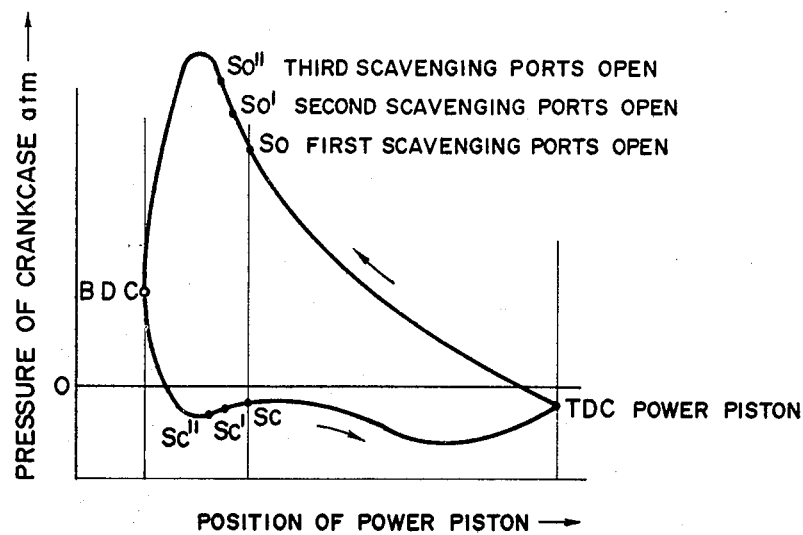
FIGS. 13 and 14 are indicator diagrams showing changes of the crankcase pressure relative to the position of the power piston in the engine shown in FIGS. 11 and 12, in full throttle operation and idling operation, respectively.

FIG. 13 is an indicator diagram showing the crankcase pressure relative to the position of the power piston in the engine shown in FIGS. 11 and 12, in full throttle operating condition. Since the amount of scavenging mixture is large in full throttle operation, the crankcase pressure is little affected, so that it changes in accordance with movement of the power piston in substantially the same manner as in the engine proposed in the aforementioned copending U.S. patent application No. 917,244, which incorporates no scavenging ports such as the first scavenging ports 128A.

When the engine is operating at low to medium load above idling and below 0.4 delivery ratio, since the control valve 158 is closed or substantially throttled so as to supply scavenging mixture substantially exclusively through the third scavenging ports 128C towards the center of the power cylinder with no swirl being given to the flows of scavenging mixture, stratified scavenging is performed with thermal decomposition of fuel-air mixture, as explained with reference to the first embodiment.

Figure 14:
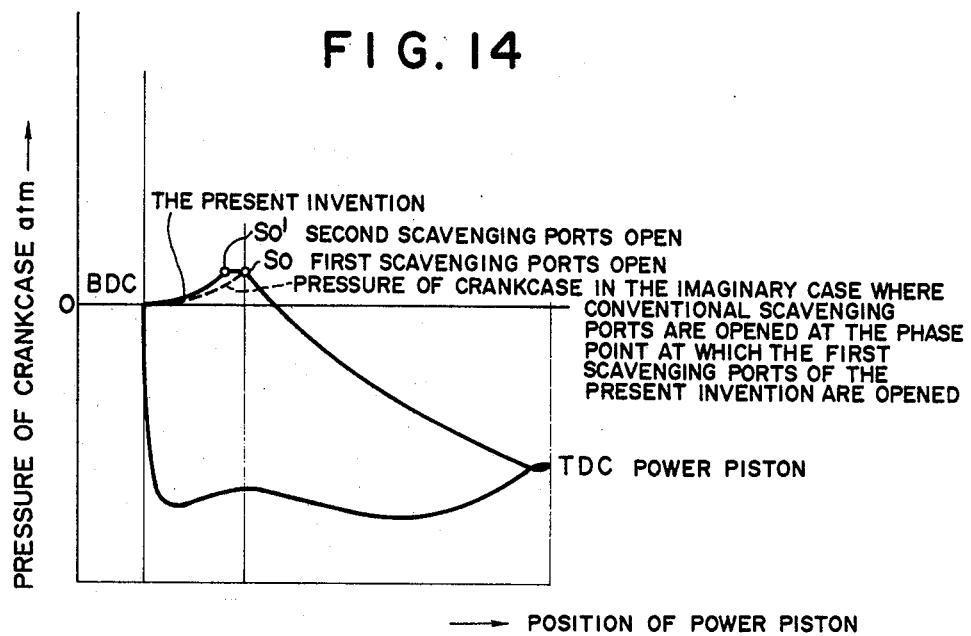

When the engine is idling or operating at very low load close to idling, the control valve 158 is opened while the control valve 159 is closed, so that scavenging mixture is supplied to the power cylinder through the first and second scavenging ports 128A and 128B. In this operation the first scavenging ports 128A having a relatively small total opening area operate effectively so as to generate strong turbulences in the power cylinder even by a relatively small amount of scavenging mixture, which is ejected through the first scavenging ports 128A before the second scavenging ports 128B having a large total opening area are opened. By this swirl generated by the first scavenging ports the combustion of fuel-air mixture in idling or very low load operation is improved. FIG. 14 is an indicator diagram showing the crankcase pressure relative to the position of the power piston of the engine shown in FIGS. 11 and 12 in idling or very low load operation of the engine.

If it is desired that the present invention should be embodied in a two-stroke cycle gasoline engine which employs only its crankcases for the compression of scavenging mixture, it will be apparent that the pump 300 and the associated structures such as passages 334, 152, and 154 in the embodiment shown in FIGS. 11 and 12 need only be deleted. Further, although in the first and second embodiments the pump 300 is constructed to incorporate two horizontally opposed pistons, the pump may be constructed as a single piston pump. In this case, it will be apparent that either one of the pump pistons 308 and 310 and its associated structure, and also its associated passages 152 or 154, in the case of the second embodiment, need only be deleted.

Furthermore, although one power cylinder-piston assembly 100 and one pump cylinder-piston assembly 300 are incorporated in an engine in the above described embodiments, if an engine having a high power output is to be constructed, more than one power cylinder-piston assembly may be incorporated in an engine, and in this connection more than one pump cylinder-piston assembly or a pump of a double acting type may be incorporated in the engine. These various modifications are shown in a similar manner in the specifications and the drawings of the aforementioned copending U.S. patent application Ser. No. 917,244 and U.S. Pat. No. 4,185,596, which should be referred to, if required.

Although the invention has been shown and described with respect to some preferred embodiments thereof, it should be understood that various changes and omissions of the form and the detail thereof may be made therein by one skilled in the art without departing from the scope of the invention.

We claim:

1. A two-stroke cycle gasoline engine, comprising: a throttle valve; at least one two-stroke cycle uniflow scavenging power cylinder-piston assembly which has a power cylinder, two horizontally opposed power pistons, and a scavenging port configuration consisting of first, second, and third scavenging port configurations each having an axis of opening along which fuel-air mixture is discharged and provided in the wall of the power cylinder so as to be successively uncovered in the specified order by one said power piston as it moves from its top dead center to its bottom dead center; said first scavenging port configuration having a substantially smaller opening area than said second and third scavenging port configurations; the axes of said first and second scavenging port configurations being substantially more inclined relative to the radius of said power cylinder than is the axis of said third scavenging port configuration so that said first and second scavenging port configurations give substantially stronger swirl to fuel-air mixture discharged therefrom than the amount of swirl, including zero swirl at its lower extremity, given by said third scavenging port configuration to fuel-air mixture discharged therefrom; a scavenging pump device including at least one pump cylinder-piston assembly of the reciprocating type driven by said power cylinder-piston assembly in synchronization therewith; a first passage which conducts fuel-air mixture from said scavenging pump device to said first and second scavenging port configurations; a second passage which conducts fuel-air mixture from said scavenging pump device to said third scavenging port configuration; and a control valve which is operationally related with said throttle valve and which substantially throttles said first passage only when the engine is operating at relatively low load in a predetermined load range, which excludes very low load including idling and medium to high load having a delivery ratio at least at a predetermined value.

2. The engine of claim 1, further comprising a second control valve which is operationally related with said throttle valve and which substantially throttles said second passage when the engine is operating at a very low load including idling.

3. The engine of claim 1, wherein said scavenging pump device incorporates crank case compression, the total stroke volume of said scavenging pump device being between 1.35 and 1.85 times as large as that of said power cylinder-piston assembly, and the operational phase of said pump cylinder-piston assembly being so shifted relative to that of the power cylinder-piston assembly to which it supplies scavenging that, when the power cylinder-piston assembly is at its bottom dead center, the pump cylinder-piston assembly is within a range between a point at and another point slightly before its top dead center.

4. The engine of claim 1, wherein the total stroke volume of said pump cylinder-piston assembly is between 1.15 and 1.65 times as large as that of said power cylinder-piston assembly, and the operational phase of said pump cylinder-piston assembly is so shifted relative to that of the power cylinder-piston assembly to which it supplies scavenging mixture that the top dead center of said pump cylinder-piston assembly is, as viewed in regard to crank angle, in a range between 15° in advance of and 15° behind the midpoint between the bottom dead center and the scavenging port closing phase point of the power cylinder-piston assembly.

5. The engine of any one of claims 1, 2, 3 and 4, wherein said predetermined delivery ratio value is 0.4.

* * * * *